United States Patent [19]

Tartaglia et al.

[11] Patent Number: 4,921,014
[45] Date of Patent: May 1, 1990

[54] NOISE-REDUCING VALVE CONSTRUCTION

[75] Inventors: Peter A. Tartaglia, Butler; Richard B. Collins, Denville; Robert S. Smolen, Bloomingdale, all of N.J.

[73] Assignee: Marotta Scientific Controls, Inc., Montville, N.J.

[21] Appl. No.: 344,297

[22] Filed: Apr. 27, 1989

[51] Int. Cl.$^5$ .............................................. F16K 47/14
[52] U.S. Cl. .............................. 137/625.3; 137/625.37; 137/494; 251/127; 138/42; 138/43
[58] Field of Search ................ 137/625.3, 625.37, 494; 251/127; 138/42, 43

[56] References Cited

U.S. PATENT DOCUMENTS

| | | | |
|---|---|---|---|
| 3,954,124 | 5/1976 | Self | 251/127 X |
| 4,249,574 | 2/1981 | Schhall et al. | 251/127 X |
| 4,567,915 | 2/1986 | Bates et al. | 251/127 X |
| 4,617,963 | 10/1986 | Stares | 251/127 X |

FOREIGN PATENT DOCUMENTS 2443206  3/1976  Fed. Rep. of Germany ...... 251/127

*Primary Examiner*—Arnold Rosenthal
*Attorney, Agent, or Firm*—Hopgood, Calimafde, Kalil, Blaustein & Judlowe

[57] ABSTRACT

The invention contemplates a valve construction which provides a radially stacked succession of mutually fitted concentric annuli fitted to an inner tubular member which is open at one end for accommodating inlet fluid flow and which is adapted along its bore and at the opposite end to guide a poppet member that is axially positionable in the bore. The tubular member has a circumferentially and axially distributed plurality of like radial passages adapted to be opened and closed in accordance with the guided position of the poppet member. Progressively increasing pluralities of such radial passages characterize each successive annulus, and all annuli are circumferentially channeled to define a manifolded relation between the plural passage discharges from one annulus and the plural passage inlets of the next annulus. Outlet or downstream flow from the valve is taken from a circumferential manifold around the outermost multiple-ported annulus. All of the plural passages are configured as diffusers, with expanding section in the radially outward direction.

16 Claims, 3 Drawing Sheets

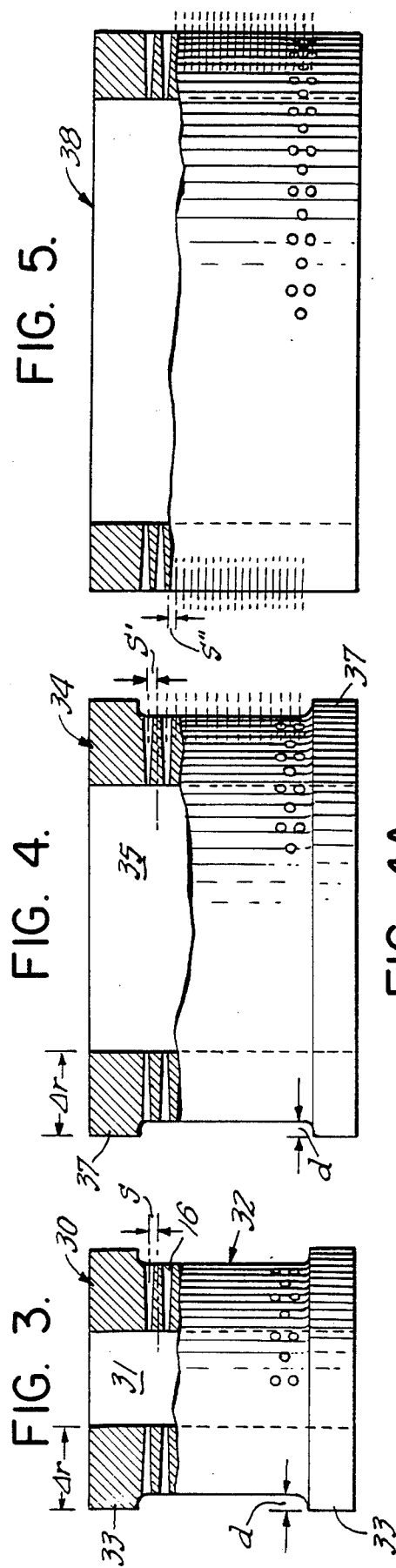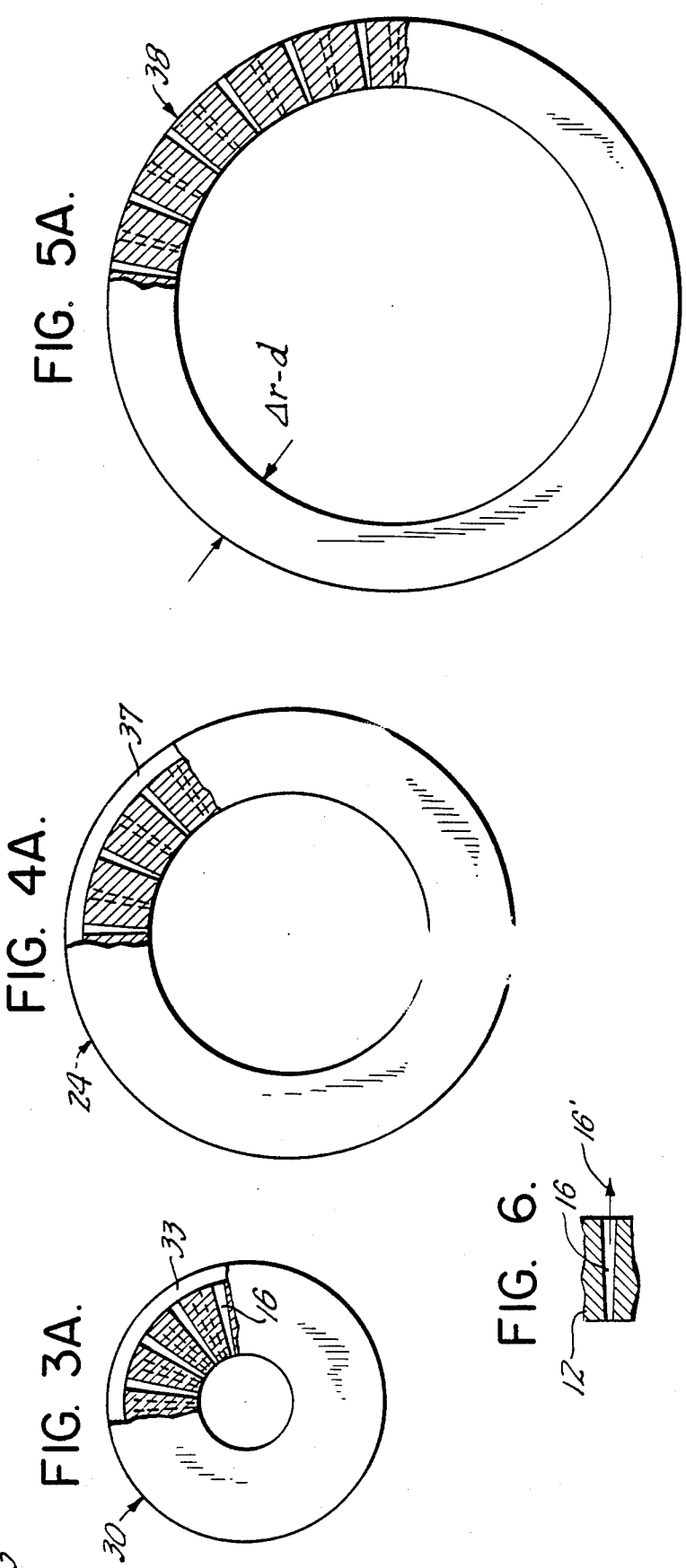

NOISE-REDUCING VALVE CONSTRUCTION

BACKGROUND OF THE INVENTION

The invention relates to a "quiet-operating" valve construction, as for use in conjunction with throttling elements of a reducing valve.

Pat. No. 3,802,537 (White) describes a noise-reducing valve construction wherein an inner conduit tube is provided with a longitudinal array of closely spaced jet ports, some or all of which will be called upon to carry fluid flow from the valve inlet (at one end of the tube) to an outlet which surrounds and envelops all of the jet ports, depending upon the axial positioning of a piston-valve member (or poppet) which is guided by the bore of the tube and which determines how many of the jet ports are to carry flow between the inlet and the outlet of the valve. For high pressure differences across the conduit, noise-producing turbulence will occur at jet-port discharge toward the outlet, were it not for the inventor's provision of plural enveloping wire-mesh screens, to produce a gradual frictional reduction in the pressure gradient between the inlet and the outlet of the valve. Various embodiments are disclosed.

The White patent configuration does not lend itself to small-scale construction, nor to the economy of pressure-reducing formations which must be observed for valves of indicated character, which illustratively may have a valve-body bore of 3/16-inch diameter, with overall body limitations in the order of one inch outer diameter and a half-inch thickness.

BRIEF STATEMENT OF THE INVENTION

It is an object of the invention to provide an improved noise-reducing valve construction of the character indicated and particularly adapted for small-scale construction.

Another object is to meet the above object with a construction in which plural multiple-ported noise-reducing stages accommodate flow through the valve, with net increase in the area of flow accommodation from a given one, to the next, successive stage.

The invention achieves these objects in a construction which provides a radially stacked succession of mutually fitted concentric annuli fitted to an inner tubular member which is open at one end for accommodating inlet fluid flow and which is adapted along its bore and at the opposite end to guide a poppet member that is axially positionable in the bore. The tubular member has a circumferentially and axially distributed plurality of like radial passages adapted to be opened and closed in accordance with the guided position of the poppet member. Progressively increasing pluralities of such radial passages characterize each successive annulus, and all annuli are circumferentially channeled to define a manifolded relation between the plural passage discharges from one annulus and the plural passage inlets of the next annulus. Outlet or downstream flow from the valve is taken from a circumferential manifold around the outermost multiple-ported annulus. All of the plural passages are configured as diffusers, with expanding section in the radially outward direction.

DETAILED DESCRIPTION

The invention will be described in detail for a preferred structural relationship, in connection with two specific embodiments, the description being in conjunction with the accompanying drawings in which:

FIGS. 3, 4 and 5 are views in side elevation, partly broken away and in section, for each one of a set of annular components of a valve according to the principles of FIG. 1;

FIGS. 3A, 4A and 5A are end views partly broken away and in section, for the respective annuli of FIGS. 3, 4 and 5;

FIG. 6 is an enlarged sectional detail to illustrate the nature of one, of the many, flow passages in either of the embodiments of FIG. 1 or FIG. 2;

Figure 1:
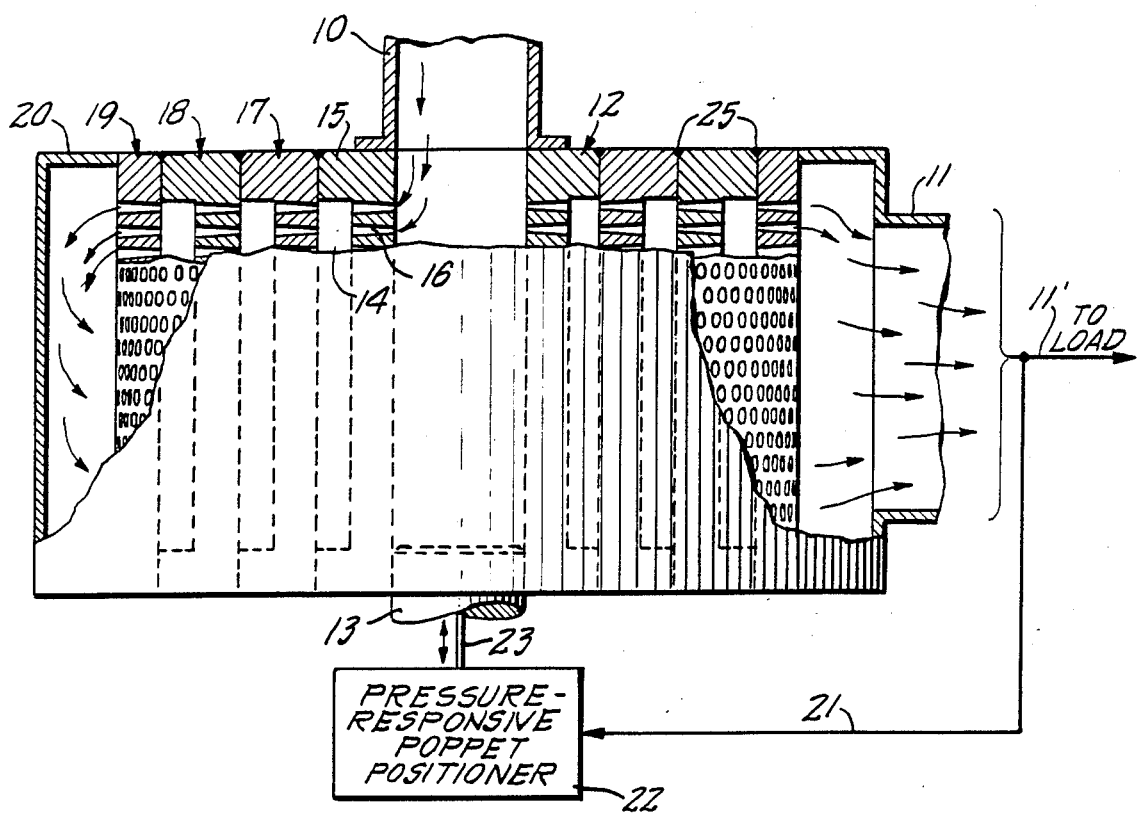
FIG. 1 is a simplified view in side elevation of a first embodiment, parts being broken-away and in section to reveal internal detail.

In FIG. 1, the invention is shown in application to a reducing valve having an inlet-flow connection 10 and an outlet flow connection 11. Construction of the body of the valve relies upon an inner tubular member 12 open at one end to receive inlet flow, and providing guide support for a poppet valve member 13, from its other end and along its length. Tubular member 12 is characterized by a circumferentially continuous groove 14 between axial-end flanges 15, and between flanges 15 a circumferentially and axially distributed plurality of like passages 16 communicate between the bore of tubular member 12 and its circumferential groove 14. The position of poppet 13 determines how many of the passages 16 are, at any one time, to play a flow-regulating part in the operation of the valve.

Surrounding and concentrically fitted to the shoulders 15 of inner tubular member 12 is a cascading succession of annuli 17, 18, 19, each of which is characterized by its own circumferentially and axially distributed plurality of passages; and individual passages of each of these annuli may be to the same size and shape specification as applies for each of the passages 16. Enlarged detail of one such passage 16 appears in FIG. 6, wherein it is seen that for the applicable radially outward flow direction 16', the passage 16 is a diffuser having a frustoconical expansion, from a radially inner entrance to a radial outer exit. Illustratively, this expansion may be 2:1 in diameter (4:1 in section area), as from 0.010-inch diameter to 0.020-inch diameter.

As in the case of inner tubular member 12, each of the successive annuli 17, 18 has its own circumferential groove between end shoulders, thereby providing axially and circumferentially extensive manifolded flow communication, from the discharge end of the passages of one annular stage to the inlet end of the passages of the next-succeeding annular stage. The outermost annulus 19 could also have been circumferentially grooved between end flanges, but in the form shown this was not necessary because a surrounding manifold member 20 is fitted to receive the discharge from the passages of annulus 19 and to communicate the same to the discharge port 11 of the valve.

To complete a description of the valve of FIG. 1, there is a schematic showing of a downstream line 11' from discharge port 11 to a load, suggested by legend. And a downstream-pressure connection 21 to line 11' serves pressure-responsive actuator means 22 having a direct displacing connection 23 to poppet member 13, thus governing the number of passages 16 in use at any one time and therefore regulating the flow in accordance with the number of passages used. For the extreme retraction position shown in FIG. 1 for poppet 13, an axially extensive spread of arrows denoting inlet-flow distribution is seen to account for outlet flow via an equally well distributed spread of arrows denoting outlet flow via the manifolding member 20. The more that the poppet is inwardly repositioned, the fewer the number of passages 16 that will be operative to determine flow through the valve, but since each stage (12, 17, 18) is axially and circumferentially manifolded to the next (17, 18, 19), the stages 17, 18, 19 serve to share the flow issuing from inner tubular member 12, regardless of poppet position.

Figure 2:
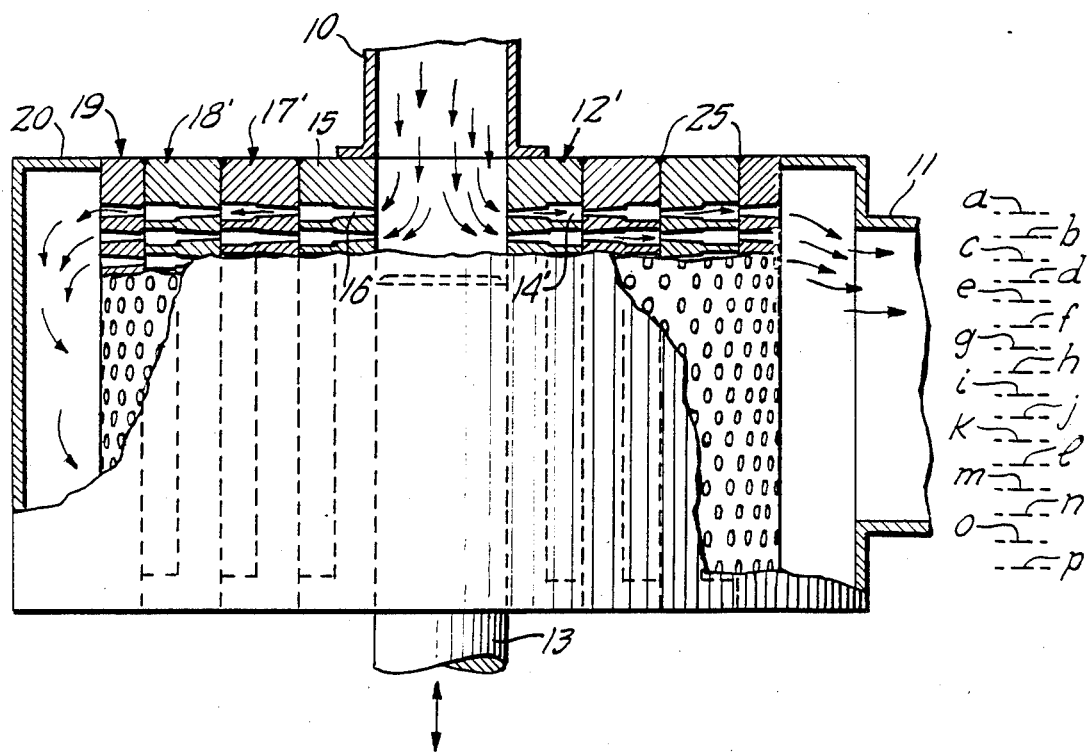
FIG. 2 is a similar view for a second embodiment.

In the valve embodiment of FIG. 2, construction can be very much the same as described for FIG. 1, with a single important exception. For each discrete one of a plurality of axially spaced planes, identified in the alphabetical succession a,b,c ... p, the inner tubular member 12' and each of the succession of stages 17', 18', has its own circumferential manifolding groove 14' and its own circumferentially distributed set of passages 16, and the passages 16 of the outermost stage 19' are in the same discrete-plane configuration. Thus, when poppet 13 is positioned as shown, only the communicating passages of the first four planes (a,b,c,d) are operative, i.e., to the exclusion of the passages of all other such planes (e,f,g, ... p). This fact is confirmed by a showing of flow arrows issuing only from these first four planes in FIG. 2. The proportionate sharing of the total flow in the valve of FIG. 2 thus remains uniform, as between all four stages (12', 17', 18', 19'), whatever the poppet position.

Before leaving FIGS. 1 and 2, it will be observed that the described coaxially nested array of successive stages lends itself to a readily dismountable nesting, as by press-fitted nesting or by axially squeezing end-clamping action by annular retaining plates (not shown) which at least in part lap all of the concentric members (12, 17, 18, 19, 20, or 12', 17', 18', 19', 20). But in the form shown, these parts are permanently assembled to each other, as by an electron-beam weldment 25 which circumferentially secures outer adjacent edges of these members to each other.

Greater detail for a three-stage multiple-passage device appears for individual component parts thereof, as depicted in FIGS. 3, 3A, 4, 4A, 5 and 5A; illustrative overall dimensions for a thus assembled device are an axial length of 1.000-inch and an outer diameter of about 2.1-inches, with a poppet-guide bore of 0.375-in. diameter. For an inlet-pressure range of 550 to 770 psig, the device will regulate to a reduced pressure of 95 psig with a flow rate of 80 SCFM; and for an inlet-pressure range of 2000 to 4500 psig, the device will regulate to a reduced pressure of 1800 psig with a flow rate of 200 SCFM. In these showings, FIGS. 3 and 3A apply to the inner tubular member 30 having a bore 31 for poppet guidance and coaction. The circumferential groove 32 between end flanges 33 is of relatively shallow depth d, compared to the relatively thick ($\Delta r$) body portion which is characterized by passages 16. These passages are in equal angularly spaced array, for each of sixteen axially spaced lanes, with an angular offset for the passages of each plane, in reference to those in the next-adjacent plane; the axial spacing between such planes is denoted S'. The passages 16 in the inner member 30 may be dimensionally as described in connection with FIG. 6, namely, diffuser-shaped and outwardly flaring from an inlet area of 0.010-in$^2$ to an exit area of 0.020-in$^2$.

The next annular stage (FIGS. 4, 4A) has a body 34 of the same thickness $\Delta r$ based on a bore 35 which has close nesting fit to the flanges 33 of body 30. Again, the outer groove 36 between end flanges 37 is to the same shallow depth d, leaving extensive body thickness for the passages 16 formed therein. In the form shown, these passages 16 are at equal angular spacing for each plane of the passages, and the passages of adjacent planes are in angularly staggered interlace. But FIGS. 4 and 4A further illustrate the provision of greater number of axially spaced planes (e.g., twenty, instead of the sixteen of FIGS. 3 and 3A), and the preference is indicated that the passages 16 of body 30 shall not have cumulating registration with the passages 16 of body 34; axial spacing between such planes is denoted S'.

The third and outer annular stage 38 (FIGS. 5, 5A) contemplates passage discharge to surrounding manifold structure as at 20 in FIG. 1, so that thickness of the outer body 38 is devoted solely to passage (16) formations therein, again in angularly staggered relation as between adjacent planes, but in a still greater number of more closely spaced planes, shown to be twenty-five in number; the axial spacing is denoted S''. Again, it is preferred that the passages 16 of body 38 shall not have cumulating registration with the passages 16 of body 34.

The annular bodies 30, 34, 38 may be fabricated from such various materials as high-strength plastics, and composites, to sophisticated metal alloys, but for most purposes, including the handling of regulated steam flows, these bodies are preferably of stainless steel. Once machined from such base material, the conical passages 16 are either laser-machined or EDM-machined. After such machining, the bodies 30, 34, 38 are assembled to each other by mating the outside diameter of inner body 30 to the bore diameter of the next adjacent body 34. From this point, as noted above, the assembly can be electron-beam welded, or it can be merely press-fitted, so as to permit disassembly for cleaning. In either case, the assembly is a rigid pressure vessel that can withstand high end loading.

Further principles of the invention will appear from specific detail for the three-stage device which results from concentric assembly of the parts of FIGS. 3, 4 and 5 to each other. For the inner member 30, it has been indicated that there are sixteen planes of angularly spaced radially oriented diffuser passages 16; for each row there are sixteen such passages, and therefore a total of 256 passages, which for the illustrative diffuser dimensions given in connection with FIG. 6 mean a combined diffuser-inlet area of 0.020-in$^2$ and a combined diffuser-exit area of 0.080-in$^2$. This exit area of 0.080-in$^2$ discharges into the annular manifold between end flanges 33, and encounters the lesser combined diffuser-inlet area of 0.025-in$^2$ offered at intermediate member 34. More particularly, the number of diffuser passages (16) in intermediate member 34 is 320, accounted for by twenty axially spaced radial planes between shoulders 37, with sixteen angularly spaced diffuser passages radially oriented in each of these planes. The combined diffuser-exit area of intermediate member 34 is 0.100-in$^2$. This exit area of 0.100-in$^2$ discharges into the annular manifold between flanges 37, and encounters the lesser combined diffuser-inlet area of 0.047-in$^2$ offered at the outer member 38. More particularly, the number of diffuser passages (16) in outer member 38 is 600, accounted for by twenty-five axially spaced radial planes, with twenty-four angularly spaced diffuser passages radially oriented in each of these planes, for a combined diffuser-exit area of 0.188-in$^2$.

Figure 7:
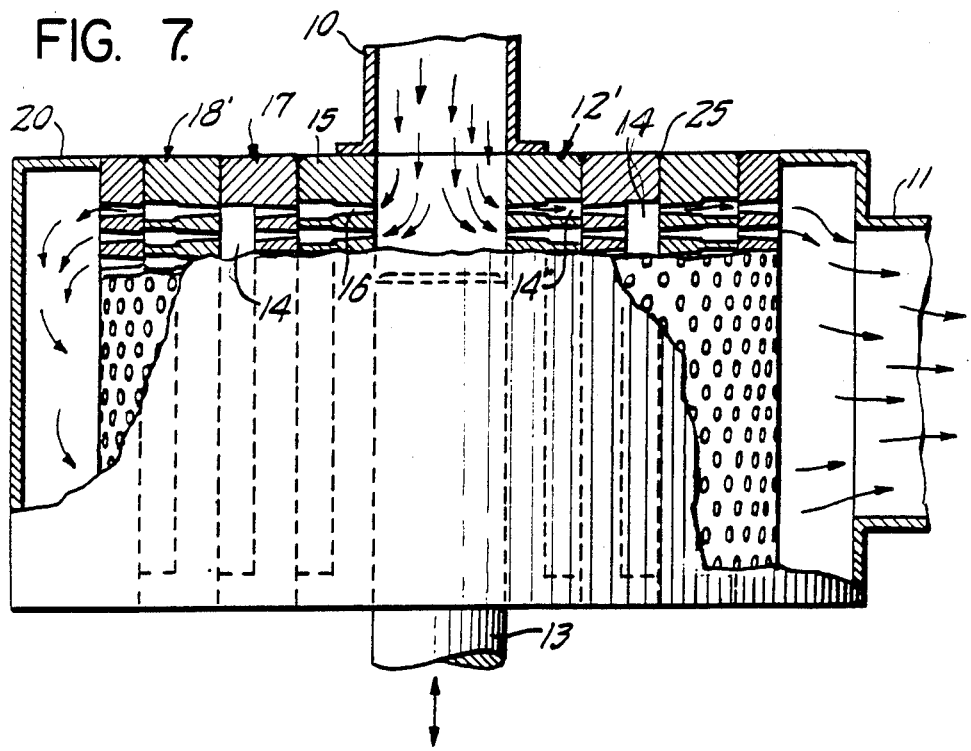
FIG. 7 is a view similar to FIGS. 1 and 2, for a third embodiment.

FIG. 7 is illustrative of another embodiment of the invention wherein a full length circumferentially continuous manifold, of the variety shown at 14 in FIG. 1, is concentrically interposed as part of tubular members 12', 18', of the variety shown in FIG. 2. The inner tubular member 12' of FIG. 7 and the passages 16 of tubular members 12' and 17 thus limit fluid flow in accordance with poppet position, to the point of discharge to manifold 14. But radially outward of the manifold 14 of tubular member 17, the fluid flow is served by all of the passages 16 of the tubular members 18' and 19.

Viewing the embodiments of FIGS. 1, 2 and 7 on a comparative basis, the form of FIG. 2 will be seen to provide the most uniformly distributed resistance to flow instantaneously accommodated pursuant to poppet-13 positioning, and the corresponding tier of passages in each of the stages 17', 18', 19 shares in the distribution of such resistance; the distribution will be in steps, as each tier or plane of passages 16 is opened in the bore of inner tubular member 15. On the other hand, the embodiment of FIG. 1 represents another extreme, wherein resistance to flow for the smallest opening of the valve is virtually entirely and only determined by the uppermost tier of passages 16 in inner tubular 15, because in the stages 17, 18, 19 all of the longitudinally and circumferentially distributed passages 16 are open, to present minimum resistance to flow; however, for poppet positions which represent greater opening of the valve, performance will approach that of the FIG. 2 embodiment, being substantially identical in performance when the full-open condition is reached. On the other hand, the embodiment of FIG. 7, wherein an intermediate manifold, as at 14, serves a plurality of tiers of passages in stages 15' and 17', the distribution of resistance to flow, as a function of instantaneous valve opening is a more non-linear function, intermediate the resistance-distribution functions of the embodiments of FIG. 1 and FIG. 2.

Figure 8:
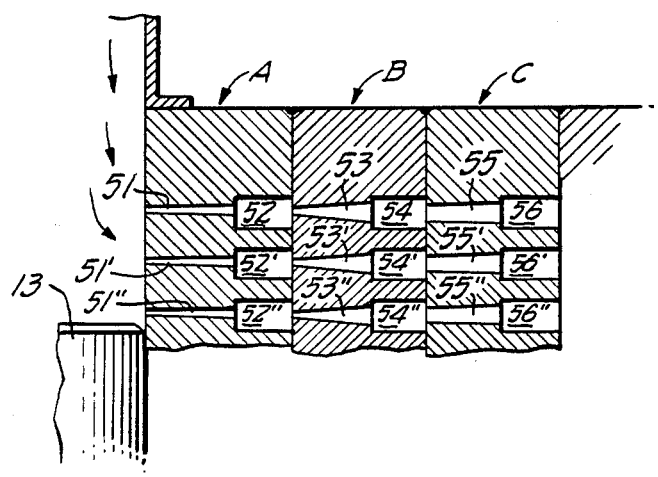
FIG. 8 is an enlarged fragmentary longitudinal sectional view to modification of FIG. 6.

The fragmentary diagram of FIG. 8 illustrates that distribution resistance to flow can also be specifically designed for particular purposes by providing a different expansion ratio in the diffuser passages of each stage of the valve. In FIG. 8, the stages A, B, C conform to FIG. 2, in the style of manifold coupling between stages. But the expansion ratio is different, for the diffuser passages 51, 51', 51" to manifolds 52, 52', 52" of inner stage A, than is the case for diffuser passages 53, 53', 53" to manifolds 54, 54', 54" of the next stage B; and the expansion ratio of diffuser passages 55, 55', 55" to manifolds 56, 56', 56" of the next-succeeding stage C is different from either of those of the two stage A and B.

Figure 9:
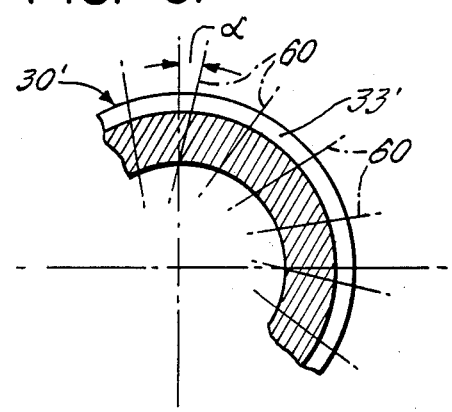
FIG. 9 is a simplified view in side elevation of a further modification illustratively in application to FIG. 3.

The fragmentary diagram of FIG. 9 is further illustrative of the fact that the central axis of each diffuser passage in a given stage, such as the stage 30', otherwise corresponding to FIG. 3A, may be inclined, all inclinations being in the same direction of yaw from a strictly radial direction. For simplicity in FIG. 9, merely central axes are shown for the respective diffuser passages 60 discharging to manifold 33', and the consistent yaw direction α is indicated for inclination from the strictly radial direction. Upon discharge into manifold 33', it will be understood that such discharges have a consistent component of swirl in the clockwise direction, thus producing more effective sharing of entrance access to inlets of diffuser passages (not shown) in the next-succeeding stage.

A variety of materials has been indicated for the tubular members which become successive stages for noise-reduction in the completed valve. In any heavy-duty environment such as in control of high-pressure steam, it is preferred that all operative parts be of stainless steel, in which case it is preferred that diffuser passages be formed by laser drilling, in precisely indexed successive steps and in the radially inward direction. Control of the rate of radially inward drilling advance will thus be a factor in determining expansion ratio for each diffuser passage, and the inherent property of laser drilling, namely to produce a conical wall of generally randomly distributed surface roughness is regarded as a significant aid to noise-reducing performance in the valve into which thus-drilled stages are embodied.

In certain hydraulic applications, as where equal pressure drops are desired across the rings of successive stages, it may be considered desirable to provide an equal or lesser total area relation between (a) inner-member passages discharging into the manifold between inner and outer members of a given radially adjacent pair of stages and (b) the total entrance area of outer-member passages.

What is claimed is:

1. Noise-reducing valve structure, comprising a first tubular member open at one end for accommodating inlet fluid flow, a poppet member guided by the bore of said tubular member for actuated displacement via the opposite end of said tubular member, said tubular member having a circumferentially and axially distributed plurality of like generally radial passages adapted to be opened and closed in accordance with the guided position of said poppet member, said first tubular member being one of a plurality of fitted concentric tubular members each of which has a circumferentially and axially distributed plurality of like radial passages, the interface region between each pair of radially adjacent tubular members being characterized by a circumferentially continuous manifold formation, the radial passages of all said tubular members being characterized by progressively expanding section area in the radially outward direction, whereby, for other than a valve-closing position of said poppet member, fluid flow via passages of the inner tubular member of each said pair is to a manifold formation between the inner and outer tubular members of each said pair, and a valve-body outlet having circumferentially manifolded communication with all passages of the outermost one of said tubular members.

2. Noise-reducing valve structure according to claim 1, wherein the interface region between each pair of radially adjacent tubular members is characterized by a single manifold formation which communicates between all the radial passages of both tubular members of each said pair.

3. Noise-reducing valve structure according to claim 1, in which the radial passages of all of said tubular members are identical.

4. Noise-reducing valve structure according to claim 1, in which the section-area expansion ratio for the radial passages of one of said tubular members is different from the section-area expansion ratio for the radial passages of the tubular member that is adjacent to said one tubular member.

5. Noise-reducing valve structure according to claim 1, in which, for each pair of radially adjacent tubular members, the number of radial passages in the outer tubular member exceeds the -number of radial passages in the inner tubular member.

6. Noise-reducing valve structure according to claim 4, in which, for each pair of radially adjacent tubular members, (a) the number of radial passages in the outer tubular member exceeds the number of radial passages in the inner tubular member, and (b) the total area of inner-member passages discharging into the manifold between inner and outer members of said pair exceeds the total entrance area of outer-member passages.

7. Noise-reducing valve structure according to claim 1, wherein the interface region between each pair of radially adjacent tubular members is characterized by an axially spaced plurality of circumferentially continuous independent manifold formations, each of which communicates between its own pluralities of inner and outer-member passages.

8. Noise-reducing valve structure according to claim 1, in which the radial passages of all tubular members are arrayed in the same succession of axially spaced radial planes, and in which at the interface region between each pair of radially adjacent tubular members, an axially spaced plurality of independent circumferentially continuous manifolds serves only for independent communication between radial passages of each of said respective radial planes.

9. Noise-reducing valve structure according to claim 1, in which each of said passages in at least one of said tubular members is characterized by a central axis which is inclined at an acute angle to a strictly radial orientation with respect to the axis of said tubular member.

10. Noise-reducing valve structure according to claim 1, in which the wall of each passage is characterized by a random distribution of turbulence-enhancing roughness.

11. Noise-reducing valve structure, comprising a first tubular member open at one end for accommodating inlet fluid flow, a poppet member guided by the bore of said tubular member for actuated axial displacement via the other end of said tubular member, said tubular member having a circumferentially and axially distributed plurality of like generally radial passages adapted to be opened and closed to fluid flow in accordance with the guided position of said poppet member, each of said radial passages being characterized by a diffusing cross-section which expands in the radially outward direction, and valve-outlet means including a circumferentially continuous manifold surrounding said tubular member and in fluid communication with the radially outer limit of the diffusing cross-section of all said passages.

12. Noise-reducing valve structure according to claim 11, in which each of said passages is characterized by a central axis which is substantially radial with respect to the axis of said tubular member.

13. Noise-reducing valve structure according to claim 11, in which each of said passages is characterized by a central axis which is inclined at an acute angle to a strictly radial orientation with respect to the axis of said tubular member.

14. Noise-reducing valve structure according to claim 11, in which each of said passages is the product of laser-drilling said tubular member in a generally radially inward direction, whereby the wall of each passage is characterized by a random distribution of turbulence-enhancing roughness.

15. Noise-reducing valve structure according to claim 1, in which the plurality tubular members is at least three, wherein the interface region between the inner pair of radially adjacent tubular members is characterized by an axially spaced plurality of circumferentially continuous independent manifold formations, each of which communicates between its own pluralities of inner-member passages and of next-adjacent-member passages, and wherein the interface between the outer pair of radially adjacent tubular members is characterized by a circumferentially continuous manifold formation which communicates with all passages of the members of said outer pair.

16. Noise-reducing valve structure according to claim 11, in which, for each pair of radially adjacent tubular members, (a) the number of radial passages in the outer tubular member exceeds the number of radial passages in the inner tubular member, and (b) the total area of inner-member passages discharging into the manifold between inner and outer members of said pair is equal to or less than the total entrance area of outer-member passages.

* * * * *